United States Patent [19]

Manor

[11] Patent Number: 5,077,977
[45] Date of Patent: Jan. 7, 1992

[54] METHOD AND APPARATUS FOR COOLING AND SCANNING INFRARED DETECTOR ASSEMBLIES

[75] Inventor: Eliezer Manor, Doar Na Emek Sorek, Israel

[73] Assignee: Shirat Enterprises Ltd., Tel-Aviv, Israel

[21] Appl. No.: 542,141

[22] Filed: Jun. 22, 1990

[30] Foreign Application Priority Data

Aug. 11, 1989 [IL] Israel ........................................ 91281

[51] Int. Cl.$^5$ .............................................. F25B 9/00
[52] U.S. Cl. ......................................... 62/6; 60/520; 92/117 A; 250/352; 250/370.15
[58] Field of Search .......................... 92/117 A; 62/6; 250/352, 370.15

[56] References Cited

U.S. PATENT DOCUMENTS

| | | | |
|---|---|---|---|
| 2,800,111 | 7/1957 | Schnurr et al. | 92/117 A |
| 4,206,609 | 6/1980 | Durenec | 62/6 |
| 4,924,675 | 5/1990 | Higham et al. | 62/6 |

Primary Examiner—Ronald C. Capossela
Attorney, Agent, or Firm—Benjamin J. Barish

[57] ABSTRACT

A method and apparatus for simultaneously cooling and scanning an infrared detector assembly, by mounting the infrared detector assembly on the cold surface of a cylinder-piston type cooling device in the image plane of an optical assembly, and driving the cylinder through reciprocations with respect to the piston to also reciprocate the infrared detector assembly perpendicular to the optical axis of the optical assembly. The disclosed cooling device is a Stirling cooler having a compressor section and an expander section, and the cold surface, which is reciprocated and on which the infrared detector assembly is mounted, is the cold tip on the outer face of the cylinder in the expander section.

19 Claims, 2 Drawing Sheets

1

METHOD AND APPARATUS FOR COOLING AND SCANNING INFRARED DETECTOR ASSEMBLIES

BACKGROUND OF THE INVENTION

The present invention relates to a method, and also to apparatus, for cooling and scanning infrared devices, particularly infrared detector assemblies.

Infrared detector assemblies, used for thermal imaging or non-imagining purposes, have to be cooled to a very low temperature corresponding to that of liquid nitrogen. Cryogenic coolers operating according to the Stirling thermodynamic cycle are commonly used for this purpose. Such coolers include a compressor section having a piston (commonly called the compressor-piston) and an expander section also having a piston (commonly called the displacer). The outer surface of the expander section is cooled (the latter being called the "cold finger"), and the infrared detector assembly is mounted on that surface. In the conventional Stirling cooler, the displacer (expander-piston) is reciprocated with respect to the outer housing of the cold finger. When such Stirling coolers are used for cooling infrared detector assemblies, the infrared detectors are scanned by mechanical scanning devices, such as rotating mirrors either along one axis (line scanner) or along two axes (two-dimensional scanner).

OBJECTS AND SUMMARY OF THE INVENTION

An object of the present invention is to provide an improved method and apparatus for both cooling and scanning an infrared device, and particularly an infrared detector assembly.

According to the present invention, there is provided a method of cooling and scanning an infrared detector assembly, comprising: mounting the infrared detector assembly on the cold surface of a cylinder-piston type cooling device in the image plane of an optical assembly; and driving the cylinder through reciprocations with respect to the piston to also reciprocate the infrared detector assembly perpendicular to the optical axis of the optical assembly, thereby simultaneously both cooling and scanning the infrared detector assembly.

In the preferred embodiments of the invention described below, the cooling device is a Stirling cooler having a compressor section and an expander section. The cold surface which is reciprocated, and on which the infrared detector assembly is mounted, is the cold tip on the outer face of the cylinder in the expander section. More particularly, the outer face of the expander section includes a cylindrical wall enclosing the expander-piston and closed at its outer end by a circular end wall. The cylindrical wall is reciprocated parallel to its longitudinal axis, and the infrared detector assembly is preferably mounted on the cylindrical wall adjacent to the circular end wall. It could, however, also be mounted on a thermally-conductive extension secured to the circular end wall.

The Stirling cooler may be of the integral construction, including a common cylinder for the compressor and expander sections; alternatively, it may be of the split construction, including a separate cylinder for each of the compressor and expander sections.

According to further features, the method may include the further step of mounting a light-emitting device on another portion of the reciprocating cylinder, and controlling the energization of the light-emitting device by output signals from the infrared detector assembly.

The invention also provides apparatus operating according to the above method.

It will thus be seen that the method and apparatus of the present invention greatly simplify the construction of systems including infrared detector assemblies which have to be both cooled and scanned, since the reciprocation of the cold surface for effecting the cooling of the infrared detector assembly also simultaneously effects its scanning.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
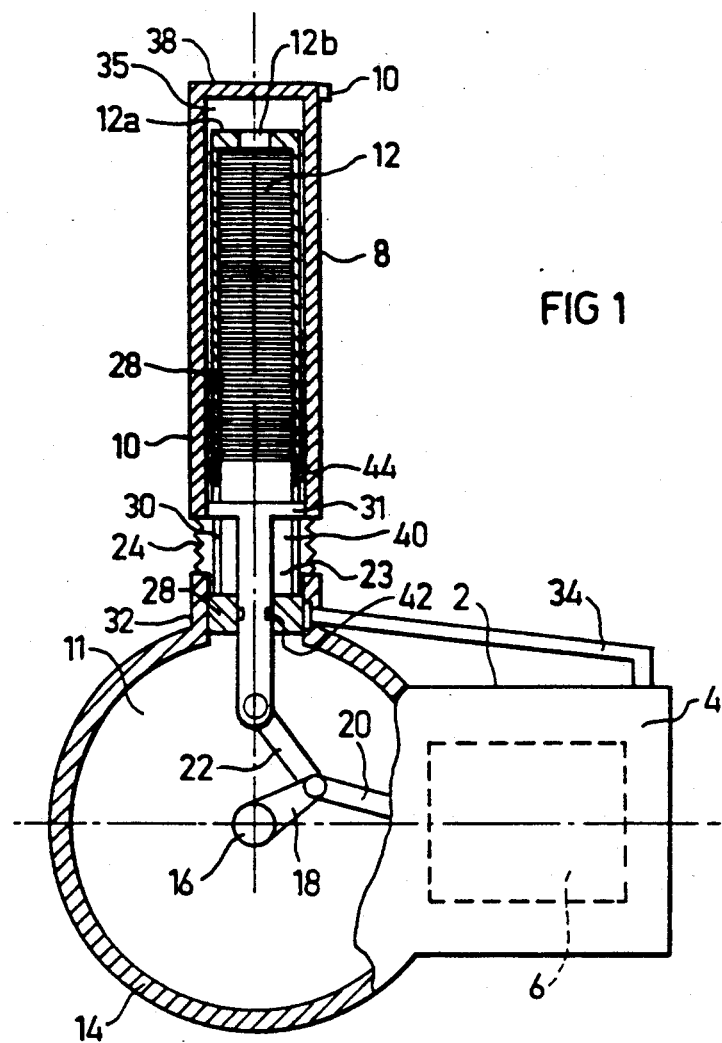
FIGS. 1 and 2 illustrate two forms of apparatus, namely an integral-Stirling cooler and a split-Stirling cooler, constructed in accordance with the present invention for cooling and scanning an infrared device.

FIG. 1 illustrates one well-known form of Stirling cooler, namely the integral construction type, commonly used for cooling infrared detector assemblies to the low temperatures required for their operation, except that the illustrated cooler has been modified in accordance with the present invention. Thus, the illustrated cooler includes a compressor section 2 comprising a cylindrical housing 4 enclosing a reciprocatable piston 6, and an expander section 8 comprising a cylindrical housing 10 enclosing a piston 12 which, as mentioned earlier, is called the displacer in the conventional Stirling cooler. Housing 4 of the compressor section 2 is integrally formed with the crank case 14 enclosing the crank shaft 16 driven by any suitable drive, such as an electric motor (not shown), and coupled by connecting rods 18 and 20 to reciprocate piston 6 in the compressor section 4.

In the conventional Stirling cooler, crank shaft 16 is also coupled by a connecting rod, such as shown at 22, to drive the displacer, (expander-piston) 12 in the expander section 8. In the modified cooler of the present invention, however, displacer 12 is static, and is fixed to crank case 14, and instead, connecting rod 22, reciprocates housing 10 of the expander section with respect to the static displacer 12. To permit this reciprocatory movement of the expander housing section 10, it is mounted to the crank case 14 by an annular bellows 24 or other flexible connection.

During the reciprocation of the expander section housing 10, the displacer 12 is held fixed to the crank case 14 by a bar 28 which in turn is fixed to the crank case 14. The other end of the displacer 12 is formed with a circular end wall 12a provided with a central opening 12b to permit the refrigerant fluid to flow into chamber 36 of the expander section housing 10. Housing 10 is closed by circular end wall 38.

The structure and operation of the cooler illustrated in FIG. 1 is basically the same as in the conventional cooler of this type, except that, instead of the displacer (expander-piston) 12 of the expansion section 8 being reciprocated by the drive, the housing 10 of the expander section 8 is reciprocated by the drive, this being permitted by the bellows 24.

The infrared detector assembly ID to be cooled is mounted on the cold tip (i.e., the coldest part) of housing section 10. Usually, it is mounted on the outer surface of its closed end wall 38. In the present case, however, it is mounted at the end of the cylindrical wall of the reciprocating housing section 10 adjacent to its circular end wall 38 and in the image plane of an optical assembly. Thus, during the operation of the cooler, the reciprocation of cylindrical wall 10 of the expander section 12 effects the cooling of the expander section and of the infrared detector assembly ID mounted on the outer face of its tip; but such reciprocations also may be used to effect the scanning of the infrared detector assembly since it is reciprocated in the image plane of the optical assembly and perpendicularly to its optical axis. This will be described more particularly below with respect to FIG. 3.

Figure 2:
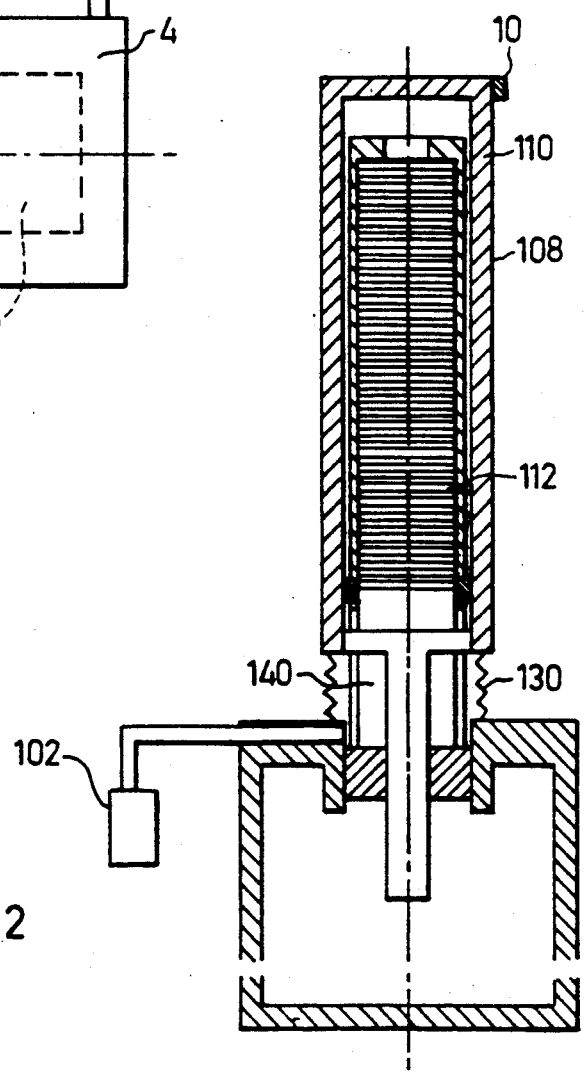

FIG. 2 illustrates the foregoing features of the invention embodied in a split type Stirling cooler, wherein the housing of the compressor section, generally designated 102, is separate and apart from the housing of the expander section 108. In the construction illustrated in FIG. 2, the expander section 108 includes the above-described features wherein the displacer (expander-piston) 112 is static, and the outer expander housing 110 (i.e., the cold finger), is reciprocated, this being permitted by a bellows mounting 130 for the reciprocating housing 110, similar to the construction illustrated in FIG. 1.

The cooler illustrated in FIG. 2 thus operates in substantially the same manner as described above with respect to FIG. 1, except that housing 110 of the expander section 108 is reciprocated, not by a positive drive as in FIG. 1, but rather by the pressure pulse of the pressurized fluid fed into chamber 140 from the compressor section 102. As in the FIG. 1 construction, the infrared detector assembly ID is mounted on the outer surface at the tip of the expander section housing 110 (i.e., the cold finger) so that the reciprocation of housing 110 not only effects the cooling of the infrared detector assembly, but may also may be used to effect its optical scanning.

Figure 3:
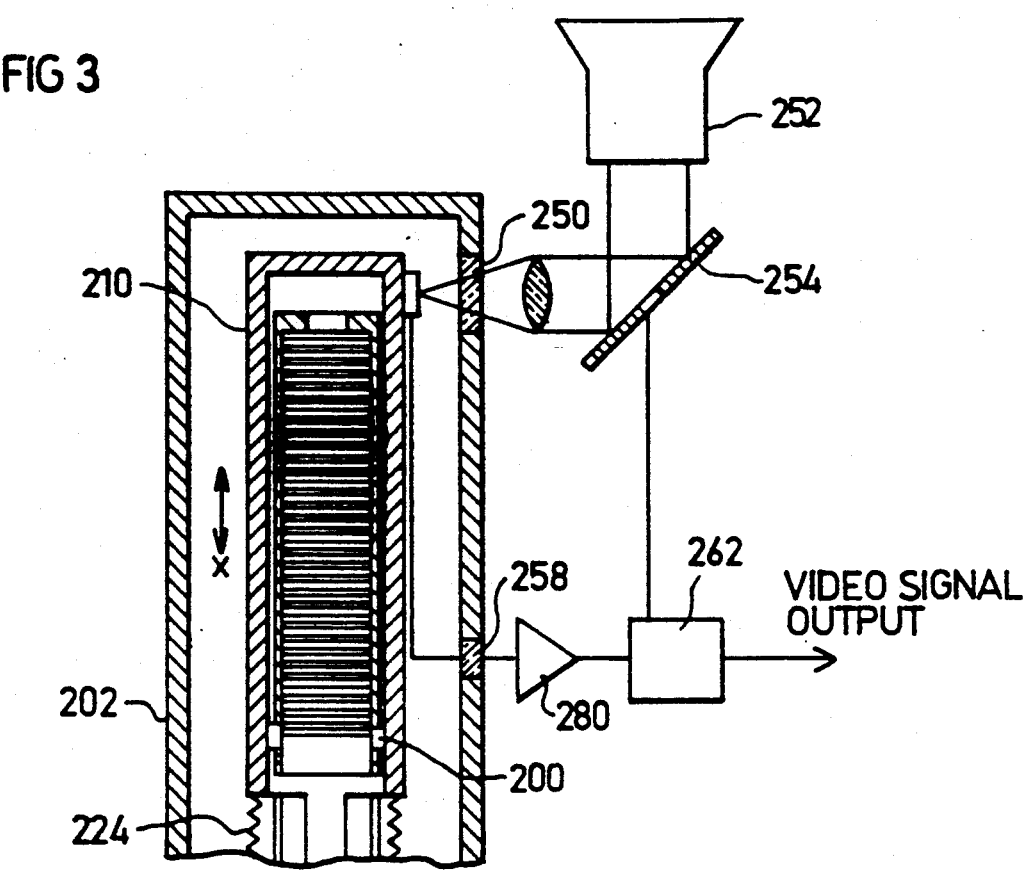
FIG. 3 illustrates an infrared detector cooling and scanning system including the cooling device of either FIGS. 1 or 2.

A complete detector system including the infrared detector assembly ID and its optical scanner is illustrated in FIG. 3. Thus, the illustrated system includes a Stirling cooler, generally designated 200, which may be of either the integral type illustrated in FIG. 1 or the split type illustrated in FIG. 2. The infrared detector assembly ID is mounted on the outer surface of the tip of the housing 210 in the expander section, which is mounted for reciprocatory movement by bellows 224 as described above.

The cooler, or at least its expander section, is enclosed within outer casing 202. This casing is provided with a window 250 in alignment with the infrared detector assembly ID and extending for the complete length of its reciprocatory movements. In alignment with window 250 is an optical system 252 including an optical scanner 254 which scans the image viewed by the optical system 252 along one dimension, namely that perpendicular to the axis of reciprocation of the infrared detector ID. Thus, the scanner 254, which may be a conventional mechanical type scanner such as a rotary mirror, effects the scanning along one dimension whereas the reciprocation of the infrared detector assembly during the operation of the Stirling cooler 200 effects scanning along the second dimension.

The infrared detector assembly ID converts the viewed optical image to electrical signals which are transmitted via conductor 256 passing through a feed-through opening 258 in vacuum jacket 202 to a power amplifier 260 and an image processor 262, for display, storage, or further processing.

Figure 4:
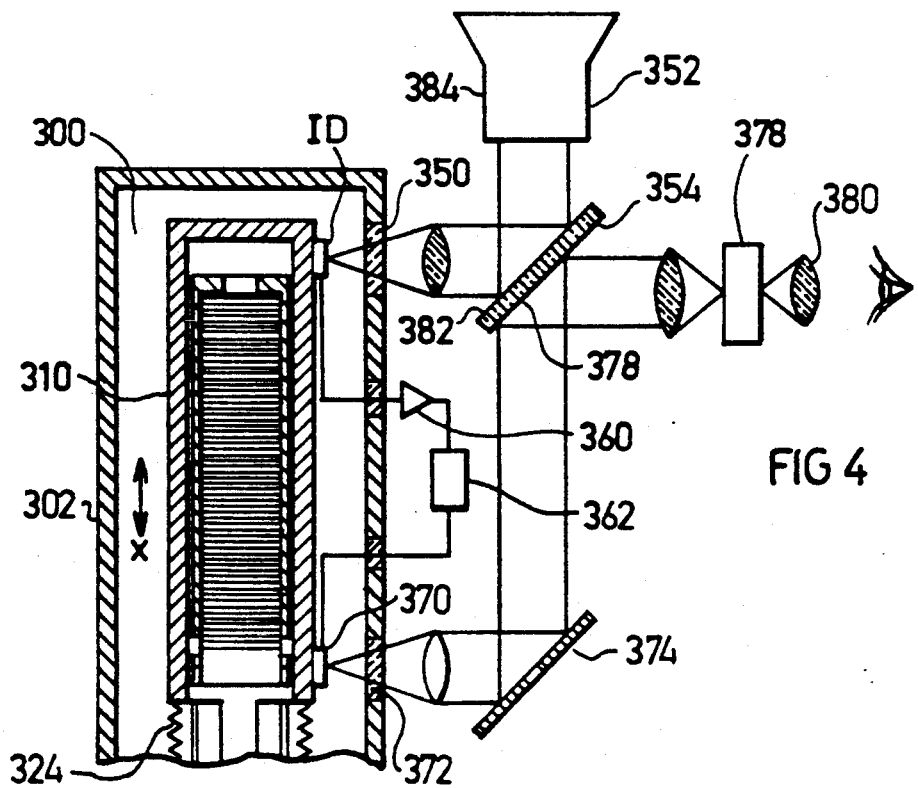
FIG. 4 illustrates a viewing system including an infrared detector assembly and the cooling device of either FIGS. 1 or 2, together with a light-emitting device controlled by the infrared detector assembly.

FIG. 4 illustrates a further application of the invention wherein the reciprocatory movements of the housing in the expander section of the cooler are used for performing a further function, namely for controlling a viewing system permitting the image detected by the infrared detector assembly to be viewed. Thus, the system illustrated in FIG. 4 includes basically the same system as illustrated in FIG. 3, but modified so as to include optics for permitting the image intercepted by the infrared detector assembly ID to be viewed both through infrared viewing optics and through visible-light viewing optics.

More particularly, the system illustrated in FIG. 4 also includes a Stirling cooler, generally designated 300, including an outer casing 302 enclosing the housing or cylinder 310 of the expander section of the cooler, which is mounted for reciprocatory movement by bellows 324 as described above. Outer casing 302 is provided with a window 350 in alignment with the infrared detector assembly ID and extending for the complete length of its reciprocatory movements, and an optical system 352 including an optical scanner 354 which scans the image viewed by the optical sytem along the axis perpendicular to the axis of reciprocation of housing 310 and the infrared detector ID. The output of the infrared detector ID is amplified by amplifier 360 and is fed to a driver circuit 362.

Driver circuit 363 is used to control the energization of a light-emitting or laser diode 370 mounted on the lower (i.e., warmer) part of the reciprocating cylinder 310; and the outer casing 302 is formed with a second window 372 in alignment with diode 370. The light emitted by the diode and passing through window 372 is reflected by a mirror 374 upwardly to optical scanner 354. The latter scanner includes a mirror 376 which reflects the visible light from diode 370 via an image intensifier 378 to an eyepiece 380 for direct viewing by an observer. Optical scanner 354 includes a second mirror 382 aligned with the front infrared optics unit 384 which recives the infrared radiation and directs it via window 350 onto the infrared detector ID.

It will thus be seen that the original infrared image received by the front infrared optic system 384 is scanned along one axis by optical scanner 354 before it is projected via window 350 onto the infrared detector assembly ID, and is scanned along the second axis by the reciprocations of cylinder 310. It will also be seen that the output from the infrared detector assembly ID controls the energization of the light-emitting or laser diode 370 which, via window 372, mirror 374, and scanning device 354, converts the infrared image to a natural-light image. This latter image is projected via image intensifier 378 to the viewer's eyepiece 380.

It will be appreciated that the invention could be used in a one-dimensional line scanning device, or in a two-dimensional image-scanning device; and the infrared detectors may be in the form of a single element, or in the form of a number of elements arranged in a row or a matrix. Many other variations, modifications and applications of the invention will be apparent.

What is claimed is:

1. A method of cooling and scanning an infrared detector assembly, comprising:
   mounting the infrared detector assembly on the cold surface of a cylinder-piston type cooling device in the image plane of an optical assembly; and
   driving the cylinder through reciprocations with respect to the piston to also reciprocate the infrared detector assembly perpendicular to the optical axis of the optical assembly, thereby simultaneously both cooling and scanning the infrared detector assembly.

2. The method according to claim 1, wherein said cooling device is a Stirling cooler having a compressor section and an expander section, and wherein said cold surface, which is reciprocated and on which the infrared detector assembly is mounted, is the cold tip on the outer face of the cylinder in the expander section.

3. The method according to claim 2, wherein said outer face of the cylinder in the expander section includes a cylindrical wall enclosing the piston and closed at its outer end by a circular end wall, said cylindrical wall being reciprocated parallel to its longitudinal axis, said infrared detector assembly being mounted on said cylindrical wall adjacent to said circular end wall.

4. The method according to claim 3, wherein said Stirling cooler is of integral construction, including a common housing for the compressor and expander sections.

5. The method according to claim 2, wherein said Stirling cooler is of split construction, including a separate housing for the compressor and expander sections.

6. The method according to claim 1, including the further steps of mounting a light-emitting device on another portion of the reciprocating cylinder, and controlling the energization of said light-emitting device by output signals from the infrared device.

7. Apparatus for cooling and scanning an infrared detector assembly, comprising:
   an optical assembly;
   a piston-cylinder type cooling device having a cold surface on its cylinder on which the infrared detector assembly is to be mounted;
   and a drive for driving the cylinder through reciprocations with respect to the piston to also reciprocate the infrared detector assembly with respect to the optical axis of the optical scanning device, thereby simultaneously cooling and scanning the infrared detector assembly.

8. The apparatus according to claim 7, wherein said cooling device is a Stirling cooler having a compressor section and an expander section, and wherein said cold surface, which is reciprocated and on which the infrared detector assembly is to be mounted, is the cold tip on the outer face of the cylinder in the expander section.

9. The apparatus according to claim 8, wherein said outer face of the cylinder in the expander section is a cylindrical wall enclosing the piston and closed at its outer end by a circular end wall, said cylindrical wall being reciprocated parallel to its longitudinal axis, said infrared detector assembly being mounted on said cylindrical wall adjacent to said circular end wall.

10. The apparatus according to claim 8, wherein said Stirling cooler is of integral construction including a common housing for the compressor and expander sections.

11. The apparatus according to claim 8, wherein said Stirling cooler is of split construction including a separate housing for the compressor and expander sections.

12. The apparatus according to claim 7, wherein said housing enclosing said expander-piston is mounted for reciprocatory movement by a flexible connection between the compressor section housing and the expansion section housing.

13. The apparatus according to claim 12, wherein said flexible connection is a bellows.

14. The apparatus according to claim 7, further including a light-emitting device mounted on another portion of the reciprocating cylinder, and means for controlling the energization of said light-emitting device by the output signals from the infrared detector assembly.

15. A Stirling cooling apparatus comprising a compressor section, and an expander section having a housing, a rotary motor and a crank shaft enclosed within said housing, an expander piston fixed to said housing, an expander cylinder enclosing said expander piston and coupled to said crank shaft to be reciprocated thereby, and a flexible connection between said housing and said expander cylinder such that said expander cylinder is reciprocated with respect to said fixed expander piston for cooling the outer surface of the expander cylinder.

16. The apparatus according to claim 15, wherein said flexible connection is a bellows.

17. The apparatus according to claim 15, wherein said Stirling cooler is of integral construction including a common cylinder for the compressor and expander sections.

18. The apparatus according to claim 15, wherein said Stirling cooler is of split construction including a separate cylinder for the compressor and expander sections.

19. A Stirling cooling apparatus comprising a compressor section; and an expander section having a housing, an expander cylinder, and an expander piston enclosed by said expander cylinder; said expander piston being fixed to said housing, and said expander cylinder being mounted for reciprocatory movement with respect to said expander piston by a bellows connected between the expander cylinder and said housing.

* * * * *